(12) United States Patent
Spiegl et al.

(10) Patent No.: US 7,007,563 B2
(45) Date of Patent: Mar. 7, 2006

(54) MONITOR TO CHECK THE PATH OF MOTION OF RECIPROCATING PISTON

(75) Inventors: Bernhard Spiegl, Vienna (AT); Peter Steinrück, Hallstatt (AT); Jürgen Murhammer, Herzogenburg (AT)

(73) Assignee: Hoerbiger Kompressortechnik Services GmbH, Vienna (AT)

( * ) Notice: Subject to any disclaimer, the term of this patent is extended or adjusted under 35 U.S.C. 154(b) by 184 days.

(21) Appl. No.: 10/694,956

(22) Filed: Oct. 29, 2003

(65) Prior Publication Data

US 2004/0083831 A1 May 6, 2004

(30) Foreign Application Priority Data

Oct. 30, 2002 (AT) .............................. A 1637/2002

(51) Int. Cl.
*G01B 7/14* (2006.01)
*G01B 21/16* (2006.01)
*G01N 3/56* (2006.01)

(52) U.S. Cl. ............................. 73/865.9; 73/7; 92/5 R; 324/207.24; 324/207.26

(58) Field of Classification Search .............. 73/865.9, 73/7, 116, 119 R, 168; 324/207.24, 207.26; 92/5 R
See application file for complete search history.

(56) References Cited

U.S. PATENT DOCUMENTS

| | | | | |
|---|---|---|---|---|
| 3,654,549 A | * | 4/1972 | Maurer et al. ...... | 324/207.24 X |
| 4,143,319 A | | 3/1979 | Rouam ........................ | 73/7 X |
| 4,855,675 A | * | 8/1989 | Russell et al. ...... | 324/207.24 X |
| 4,912,409 A | * | 3/1990 | Redlich et al. ........ | 324/207.13 |
| 4,987,774 A | | 1/1991 | DeWaal ..................... | 92/5 R X |
| 5,009,450 A | * | 4/1991 | Herberg et al. .......... | 188/266.1 |
| 5,138,934 A | * | 8/1992 | Murayama et al. ........... | 92/5 R |
| 5,150,049 A | * | 9/1992 | Schuetz ............. | 324/207.24 X |
| 5,644,227 A | * | 7/1997 | Geisel .................... | 324/207.24 |
| 5,697,472 A | * | 12/1997 | Walker et al. ......... | 188/1.11 W |
| 5,758,758 A | * | 6/1998 | Friedrich .................. | 92/5 R X |
| 5,852,936 A | * | 12/1998 | Bellak ....................... | 92/5 R X |
| 6,318,147 B1 | | 11/2001 | Steinrück et al. ................ | 73/7 |
| 6,536,266 B1 | * | 3/2003 | Akimoto ...................... | 73/116 |
| 2002/0074994 A1 | * | 6/2002 | Blubaugh et al. ...... | 324/207.13 |
| 2005/0000772 A1 | * | 1/2005 | Wohner .................... | 92/5 R X |
| 2005/0189937 A1 | * | 9/2005 | Blubaugh et al. ... | 324/207.24 X |
| 2005/0189938 A1 | * | 9/2005 | Schley et al. .......... | 324/207.15 |

FOREIGN PATENT DOCUMENTS

| | | | |
|---|---|---|---|
| DE | 2543078 | | 3/1977 |
| GB | 2267149 A | * | 11/1993 |
| JP | 62151703 A | | 7/1987 |
| JP | 2000179508 A | * | 6/2000 |

* cited by examiner

*Primary Examiner*—Thomas P. Noland
(74) *Attorney, Agent, or Firm*—Dykema Gossett PLLC

(57) ABSTRACT

A stationary arranged sensor (4) is provided in the region of one of the dead centers of the piston movement to monitor the position of the path of motion of a piston (1) relative to a cylinder (2) whereby the sensor (4) measures the lateral distance (a) to an indicator unit (6) arranged on the piston (1). The sensor (4) is arranged in a recessed position relative to the inner surface of the cylinder (2) and is sealed toward the cylinder chamber (9) by means of a cover (8), and the indicator unit (6) on the piston (1) is designed as an anomaly (10) that is non-sensitive to contaminating deposits in the area of the face (11) of the piston (1).

18 Claims, 5 Drawing Sheets

MONITOR TO CHECK THE PATH OF MOTION OF RECIPROCATING PISTON

BACKGROUND OF THE INVENTION

1. Field of the Invention

The invention relates to a monitor for monitoring the position of the path of motion of a reciprocating piston relative to the surrounding cylinder, including a sensor which communicates with an evaluation unit and which is fixedly arranged in the region of the dead center of the piston movement relative to the cylinder, and an indicator unit arranged in the region of the face of the piston, whereby the indicator unit is disposed in the region of the dead center of the piston movement in a lateral space that can be evaluated by the evaluation unit to determine the relative position of the path of motion of the piston and which lateral space can be detected by the sensor.

2. The Prior Art

Arrangements of the aforementioned type are used in reciprocating piston machines, particularly reciprocating piston compressors, to absolutely prevent metal-to-metal contact of piston and cylinder wall, which can lead to premature operational failure and expensive damages. Positioning and guiding of the reciprocating piston by means of separate rider rings or its own piston guide, as basically provided for this object, are subject to corresponding wear, especially in dry-running piston compressors, which determines the operational life of the compressor. Corresponding monitoring is required even with lubricated piston compressors to prevent costly damages on pistons and cylinder liners with lengthy non-operational periods because of failure in lubrication and subsequent abrasive wear as a result of dry friction. A prognosis of wear of the guides or the rider rings or the like is necessary for condition-based maintenance so that the available remaining operational life can be estimated with a degree of certainty. A shut-off element is often provided to protect the machine when a minimum distance is exceeded between the piston and the inner cylinder wall.

Direct measurements of the distance between the piston and the inner cylinder wall, as disclosed in U.S. Pat. Nos. 6,318,147 B1 and 4,143,319 A, are practically never used because of the exposure of the measuring point (pressure, temperature, deposits, corrosion, risk of explosion and the like) and the thereby related disadvantages. In U.S. Pat. No. 4,987,774 A is disclosed, for example, measuring or monitoring of the wear of rider rings of horizontal reciprocating compressors through determination of the descent in position of the piston rod by means of eddy current sensors. Measuring is performed by means of a sensor arranged outside of the cylinder at a location that is accessible relative easily whereby a relationship to the relevant distance of the piston on the piston rod and the inner cylinder wall is performed through triangulation of the measured value. This method is relatively inaccurate and provides only relatively unreliable information which cannot be used for the protection of the machine based on the multiplication of errors through the required triangulation as well as the negative influences of the movement of the cross head, bending of the piston rod caused by the movement biasing the piston, vibration of the piston rod, different magnetic and electric properties of the piston rod surface as a result of contaminating deposits and the like. For accurate measurement there would be additionally necessary complicated temperature compensation of the measurement signals of the eddy current sensor monitoring the distance of the piston rod sliding alongside, which would create further difficulties in practice.

JP-62-151703 A additionally discloses a method or device of the aforementioned type with an accuracy advantage in principle since possible contact between the piston and the inner piston wall of reciprocating piston machines occur, in general, interestingly at the outer, cover-side end of the piston at first whereby the determination of radial shifting of the piston or a component fixedly connected thereto (such as the piston rod protruding through the piston) has basic advantages in the region of the respective dead center of the path of motion in a plane essentially orthogonal relative to the axis of the piston. In the arrangement disclosed in the above-mentioned patent, there is an optical sensor provided in the cylinder head which evaluates the reflection of a beam of light directed onto an indicator unit on the front end of the piston rod whereby the beam of light is reflected in an altered manner corresponding to the concentrically arranged depressions and elevations of the indicator unit and the shifting thereof. One disadvantage of this known arrangement can be essentially seen in the fact that the optical measurement of the light reflection or the thereby resulting measurement signal is extremely susceptible to contamination by deposits on the sensor and on the indicator unit so that obtained measurement results give again unreliable information about the actual position of the path of motion of the piston relative to the cylinder. Moreover, the sensor is also directly exposed to the unfavorable ambient conditions existing at the measuring point (pressure, temperature, corrosion and the like) which greatly reduces also the operational life and greatly limits the range of employment of such arrangements in addition to the problems associated with the seal of the pickup bore for the sensor in the cylinder head extending all the way to the outside.

It is the object of the present invention to improve on an arrangement of the aforementioned type in such a manner that the described disadvantages of the known arrangement are avoided and that the position of the path of motion of the reciprocating piston relative to the cylinder or its spatial shifting can be detected in a simple and robust manner to make possible a dependable determination of the distance from the piston to the surrounding cylinder wall.

SUMMARY OF THE INVENTION

This object is achieved according to the present invention in an arrangement of the aforementioned type in that the sensor is arranged in a recessed position relative to the inner surface of the cylinder whereby said sensor is sealed toward the compression chamber by means of a cover, and that the indicator unit is designed as an anomaly being non-sensitive to contamination by deposits.

This embodiment guarantees now in a simple way that the sensor is protectively arranged against the unfavorable ambient conditions existing in the cylinder chamber whereby it furnishes, nevertheless, meaningful and accurate measurement results in relation to the position of the path of motion of the piston relative to the cylinder. Generally known from DE 25 43 078 A1 is the arrangement of a sensor disposed on the side of the cylinder whereby said sensor is recessed relative to the inner wall of the cylinder and sealed-off toward the cylinder chamber by means of a cover. The cover for the respective and specifically used sensor is now to be preferably designed in the most neutral way without influencing the measurement results more or less, for instance as thin as a diaphragm made of a material that does not influence as much as possible the respective measurement principle. The direct measuring of the lateral distance of a point in the region of the face of the piston relative to the stationary cylinder wall provides a meaningful and accurate measurement of the piston position with the robust embodiment and arrangement of the sensor and the indicator unit shielded from ambient influences, which measurement fulfills all requirements of the aforementioned type, and which fulfills especially the requirements for machine protection.

According to an especially preferred embodiment of the invention, there are provided a plurality of cooperating indicator units vertically spaced apart from the piston axis and/or separate cooperating indicator elements of the indicator unit vertically spaced apart from the piston axis while being separate from the sensor element which can be interrogated by the evaluation unit. Determining or monitoring of the spatial position of the dead center of the path of motion of the piston is thereby possible in a very simple way relative to the surrounding cylinder so that there can be detected and monitored not only the descent of the piston in a horizontally arranged cylinder but, in general, the drifting of the path of motion of the piston in any direction laterally to the axis of the stroke. This is advantageous, for example, for upright cylinders, cylinders with a non-contact labyrinth seal on the piston, or similar object or arrangements.

In an additional embodiment of the invention, the sensor elements are designed to operate according to different measuring principals. The control monitor can be designed thereby being tailored specifically to the respective task—for example, eddy current sensors can be employed combined with inductive or capacitive sensors whereby advantages or disadvantages of the individual measuring principals can be accurately combined or compensated for the respective purpose of employment.

In an especially preferred additional embodiment of the invention the indicator unit is designed as a spatial anomaly in the region of the face of the piston whereby the lateral distance to at least two sensor elements—which are preferably designed as eddy current sensors—can be evaluated by the evaluation unit to determine the spatial position of the dead center of the path of motion of the piston. This results in an especially simple and robust embodiment of the control monitor whereby said spatial anomaly can be designed, for example, as a projecting pin, a cup-shaped depression or the like on the face of the piston or on the front end of the piston rod protruding the piston.

According to another advantageous embodiment of the invention, the indicator unit can also be provided with at least one inserted magnetic element, preferably by forming a smooth surface in the region of the piston or the piston rod, whereby at least one of the sensor elements is designed as a magnetic field sensor, which converts the declination of the detected magnetic field lines into a measurement signal. This arrangement makes also possible accurate and meaningful measurements of the spatial position of the dead center of the path of motion of the piston relative to the cylinder with simple and robust means in existing ambient conditions.

According to an especially preferred embodiment of the invention, the sensor element (s) is/are arranged in an adapter inserted with a seal in the cylinder head. This makes possible the use of specific materials or special seals and the like to receive the sensor or to make control monitor units available which can be easily installed and exchanged.

According to another advantageous embodiment of the invention, there is arranged in the region of the face of the piston or the piston rod at least one measuring block, preferably separately mounted, serving as a spatially projecting indicator unit, which extends into at least one measuring cartridge and which is sealed toward the outside and inserted into the cylinder head as adapter, whereby at least one sensor element is arranged in said measuring cartridge that is oriented laterally toward the measuring block in the region of the dead center of the path of motion of the piston. This results in a structurally simple and robust embodiment of the monitor whereby the sensor element in the measuring cartridge is very effectively shielded from the cylinder chamber or from the unfavorable ambient conditions normally existing therein, and which makes nevertheless possible very accurate and meaningful measurements through lateral distance measurements performed essentially perpendicular to the stroke direction of the piston. The measuring block extends into the measuring cartridge in the region of the dead center of the path of motion of the piston, which permits furthermore in a simple way the use of this control monitor also as a dead center sensor. Since the measurement signal of an eddy current sensor, for example, corresponds practically to the condition of the infinite distance between the sensor element and the measuring block while the measuring block is not inserted into the measuring cartridge (especially when the piston has reached the other (lower) dead center of the path of motion), temperature compensation can be performed in such an arrangement in a very simple manner through comparison of the measurement value with the sensor signal of the piston disposed at the lower dead center.

The measuring block can be designed in the form of a cylinder having generating elements and lying parallel to the piston axis in the an area which lies opposite the sensor element(s) in the region of dead center of the path of motion of the piston, whereby the sensor element(s) detect essentially the radial distance in a standard plane to the piston axis. This results in a symmetrical structure of the arrangement, if necessary, and makes possible a simple, low-maintenance, and easy-to-assemble design of the control monitor.

In a preferred additional embodiment of the invention, the above-mentioned cylindrical measuring block can be provided with a flat surface facing the sensor element in the region of the dead center of the path of motion of the piston whereby said surface is essentially perpendicular to the connecting line leading to the surface oriented toward the sensor element, which has the advantage that small lateral piston shifts in the direction of this level, flattened surface have no influence on the measurement result.

According to an additional preferred embodiment of the invention, the measuring cartridge can be provided with at least one pickup element, which is open toward the environment and sealed toward the compression chamber, for the detection of the sensor element(s) whereby said pickup element is designed to be as thin as a diaphragm and made of a material that does not influence—or influences only to a small degree—the sensitivity of the sensor, and whereby said pickup element is disposed respectively in the area between the sensor element and the inserted measuring block. In the design of the sensor element as eddy current sensor, the pickup element or at least its diaphragm-like section is made of synthetic material, preferably fiber-reinforced. This pickup element itself can be inserted and sealed in the cylinder head in a relatively simple manner, which greatly simplifies the construction, installation and maintenance of the control monitor and which also subsequent attachment of such a monitor to a reciprocating piston compressor, for example.

In an especially preferred additional embodiment of the invention, one or each sensor element in the pickup element is arranged essentially without having a hollow space, whereby the pickup element is supported from the inside against the cylinder pressure. This makes possible the use of thin covers or diaphragms for shielding the sensor or sensor elements against the ambient conditions existing in the cylinder chamber since the cover itself does not have to absorb—or at least does not have to absorb alone—the high pressure existing in the compression chamber of a reciprocating piston compressor, for example.

The lateral distance between the sensor and the indicator unit, which is detected with the inventive control monitor in the region of the dead center of the path of motion of the piston, serves directly as wear indicator to monitor the wear of the rider rings arranged on the piston, which makes also possible the use of such a monitor in machine protection by initiating a shut-down.

In the following, the invention will be described in more detail with the aid of embodiment examples schematically illustrated in the drawings.

DETAILED DESCRIPTION OF THE PREFERRED EMBODIMENTS

Figure 1:
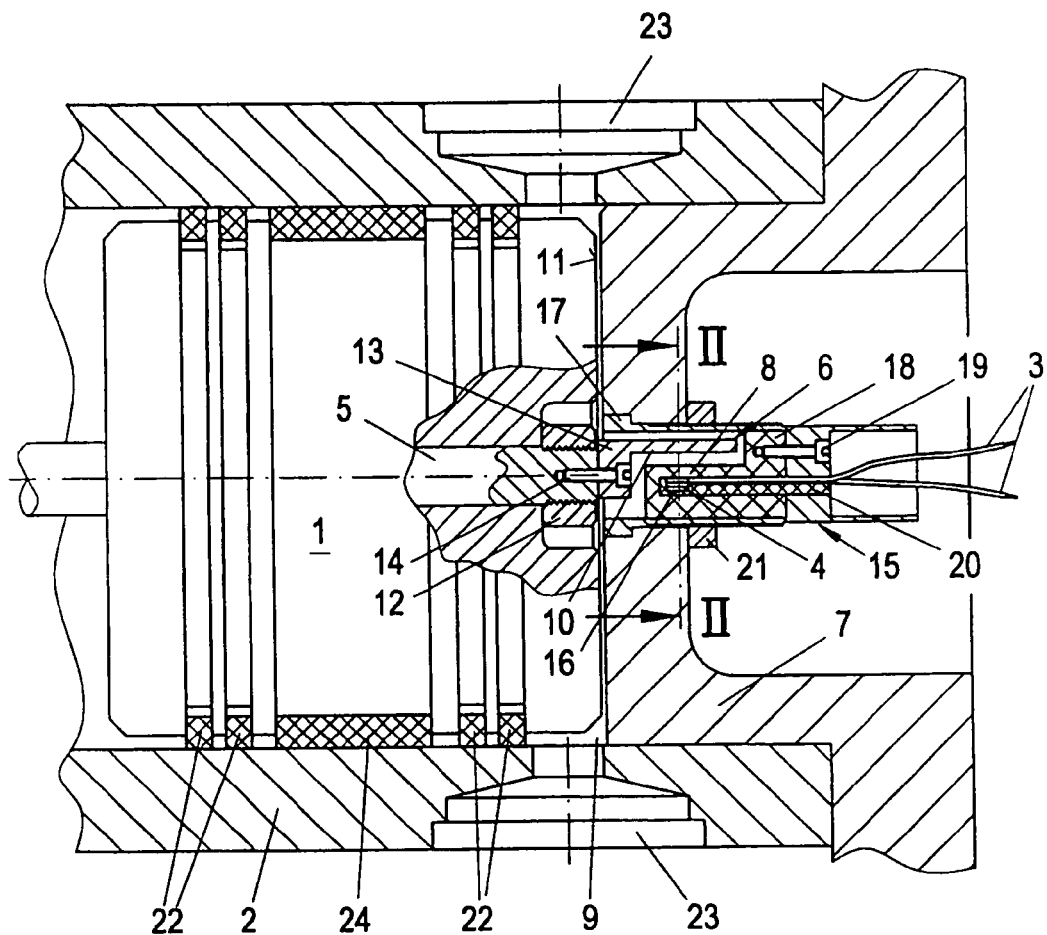
FIG. 1 shows thereby a partial section through a reciprocating piston compressor (equipped with a control monitor according to the invention) in the region of a cylinder head with the piston at the upper dead center.

All illustrated arrangements serve as monitors to monitor the position of the path of motion of a piston 1 relative to its surrounding cylinder 2 and they are provided with a sensor 4 communicating with an evaluation unit (not illustrated) via a connecting cable 3 whereby the sensor 4 is fixedly arranged relative to the cylinder 2 in the region of the upper dead center of the motion of the piston 1, as well as an indicator unit 6 arranged on the piston 1 or fixed on a component thereof, such as the piston rod 5 in this case. The indicator unit 6 is disposed in the region of the dead center of the motion of the piston 1 and detectable by the sensor 4 and disposed thereby at a lateral distance a from the sensor 4 whereby the distance can be evaluated by the evaluation unit to determine the relative position of the path of motion of the piston 1. The sensor 4 is arranged in a recessed manner in all embodiment variations relative to the inner wall of the cylinder 2 (or the cylinder head 7 in this case) and the sensor 4 is sealed off toward the cylinder chamber 9 by means of a diaphragm-type cover 8. The indicator unit 6 is designed as an anomaly 10 that is non-sensitive to contaminating deposits in the region of the face 11 of the piston 1.

Figure 2:
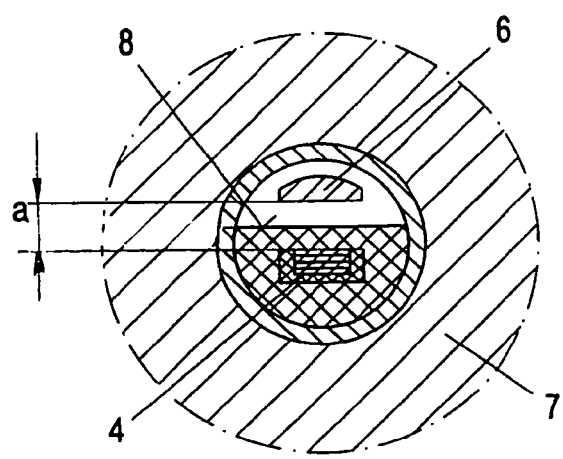
FIG. 2 shows a partial section along line II—II of FIG. 1.
Figure 3:
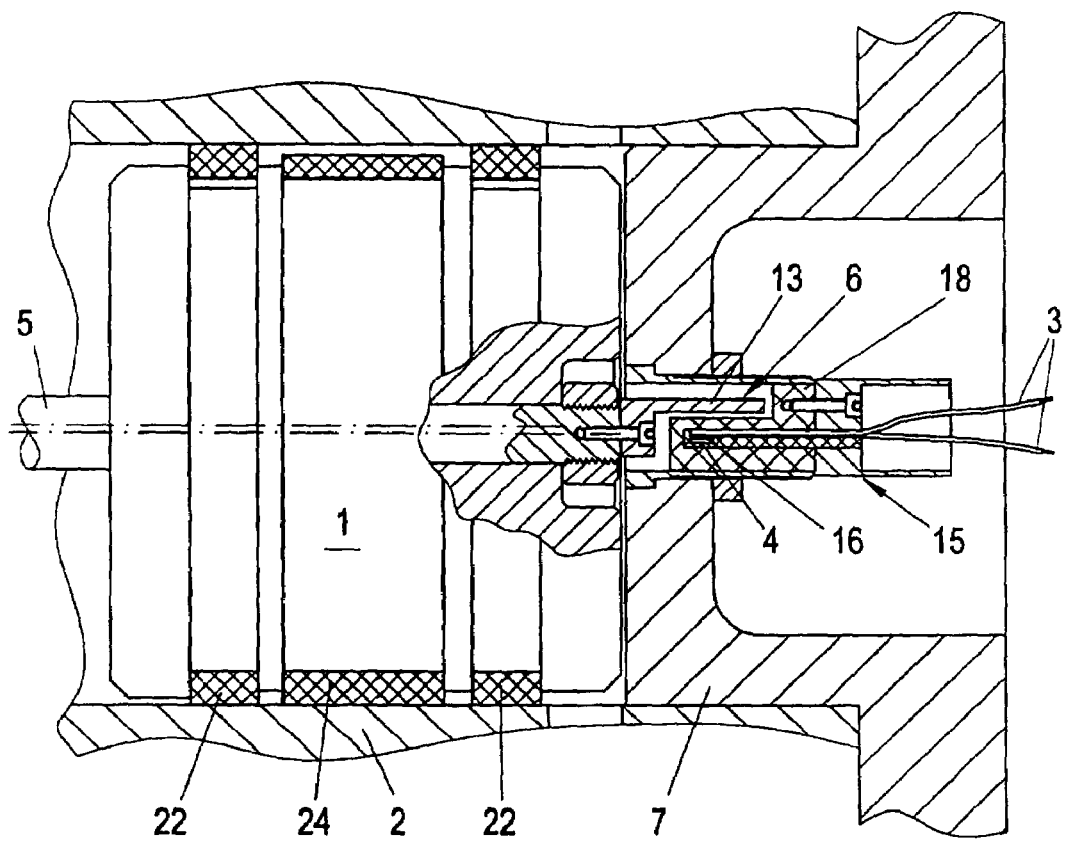
FIG. 3 shows the arrangement according to FIG. 1 and FIG. 2 in a condition of advanced wear of the rider ring on the piston.

According to FIG. 1 through FIG. 3, there is arranged and fastened by means of a screw 14 a separately mounted measuring block 13 as an anomaly 10 non-sensitive to contaminating deposits or a spatially projecting indicator unit 6 in the region of the face 11 of the piston 1 or the piston rod (onto which the piston is attached by means of a union nut 12). This measuring block 13 extends at the region of the illustrated upper dead center of the path of motion of the piston 11 into a measuring cartridge 15, which is sealed toward the outside and which is inserted into the cylinder head 7 as an adapter. A single sensor element 16, designed as an eddy current sensor, for example, is arranged laterally in the measuring cartridge 15 as a sensor 4 and oriented toward the measuring block 13. The measuring block 13 is designed having an essentially flat surface at its side facing the sensor element 16 and being oriented essentially perpendicular to the connection line leading to the sensor element 16 in the region of the dead center of the path of motion of the piston 1, as it can be seen especially in FIG. 2.

The measuring cartridge 15 is provided with a pickup element 17, which is sealed-off toward the cylinder 9 and which is open toward the cylinder chamber 9 to detect the sensor element 16, whereby said pickup element 17 is designed being thin as a diaphragm, serving as a cover 8, and made of material that does not influence—or influence only to a small degree—the sensitivity of the sensor at least in the area between the sensor element 16 and the inserted measuring block 13. The diaphragm support 18 is secured in the pickup element 17 by means of a screw 19, whereby said diaphragm support 18 is inserted into the pickup element 17 of the measuring cartridge 15 from the open side facing the cylinder chamber 9. A sensor support element 20 is pushed from the outside into the pickup element 17 or the diaphragm support 18, the pickup element 17 is then filled without having a hollow space with the inserted sensor 4 or the sensor element 16 and it is thereby supported from the inside against the inner cylinder pressure, whereby the diaphragm-type cover 8 can be designed to be relatively thin and the measurement signal of the sensor 4 is thereby not influenced at all or only at a very small degree.

The measuring cartridge 15 is pushed from the inner side of the cylinder into the corresponding bore of the cylinder head 7 and it is secured on the outside by means of a nut 21. Together with the simple design and the attachment of the measuring block 13 to the piston 1 or to the piston rod 5, it is also possible to equip a reciprocating piston compressor, for example, with the inventive control monitor at a later time.

The reciprocating piston 1 is provided here with two pairs of piston rings 22, which seal against the inner wall of the cylinder 2 and which make possible thereby controlled suction and compression of working medium through suction and pressure valves (not illustrated) arranged in the bores 23. A rider ring 24 is arranged between the pairs of piston rings 22, which consist of material that wears with time (e.g. synthetic material) whereby the piston 1 descends then from the original position, illustrated in FIG. 1 in the arrangement designed with horizontal cylinders, into the position illustrated in FIG. 3. This descent of the path of motion of the piston 1 is monitored by checking the distance between the measuring block 13 and the sensor element 16 (see FIG. 2). When dropping below a threshold value for the distance a or the distance between the underside of the piston 1 and the neighboring inner wall of the cylinder 2, either a signal requiring maintenance can be given or the compressor can be shut down as precaution.

Figure 9:
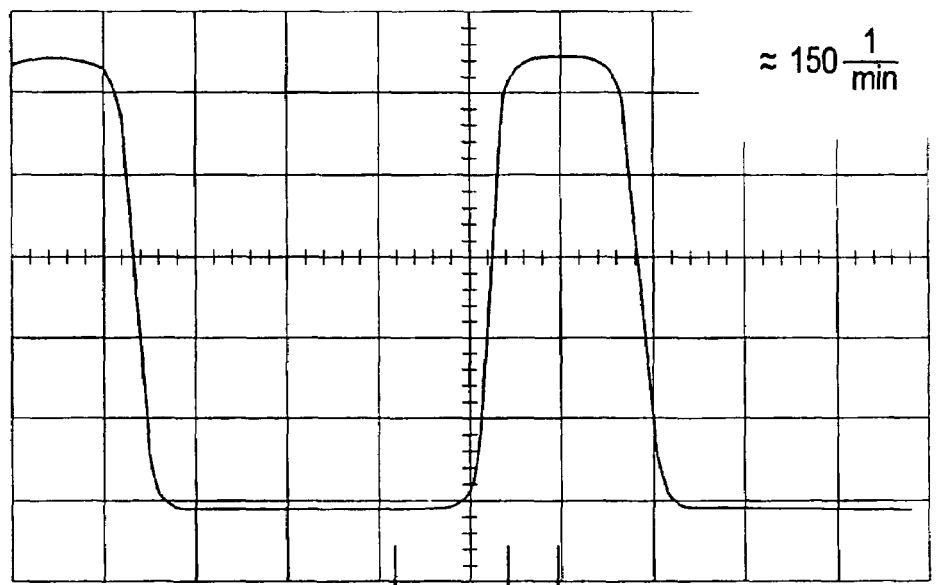
FIG. 9 shows the schematic illustration of various piston positions of an arrangement according to FIG. 1 through FIG. 3 together with exemplary measurement results of the control monitor.
Figure 9:
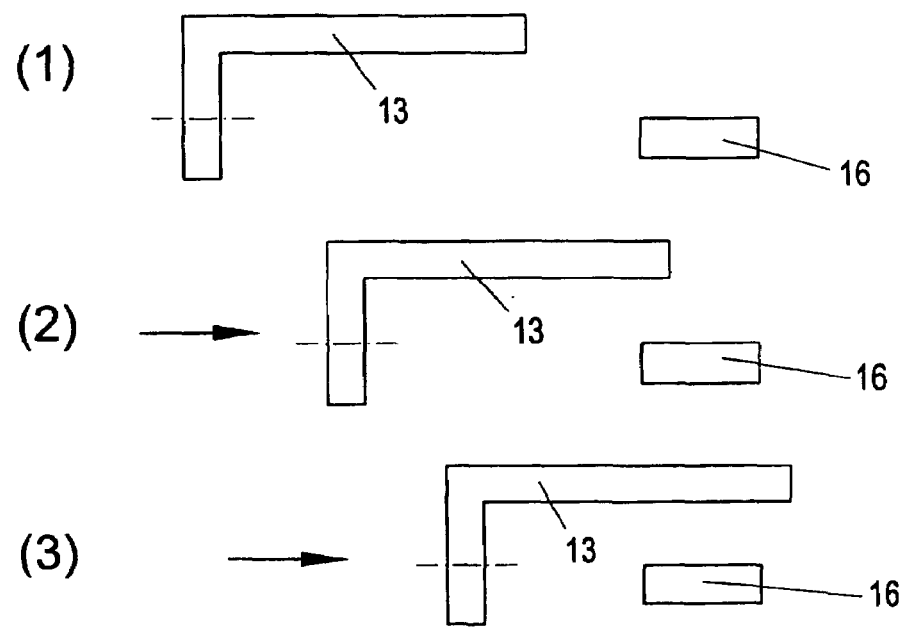

In FIG. 9 can be seen the measurement value in the upper diagram with the aid of three different relative positions (1), (2) and (3) between the schematically illustrated measuring block 13 and the sensor element 16; the sensor element 16 is here designed as a eddy current sensor. It can be seen that the measurement signal shows a minimum value at the relative position (1), which remains essentially constant also in the direction of the motion of the piston (to the lower dead center) even with greater distance between the measuring block 13 and the sensor element 16, which corresponds to the sensor signal at infinite distance between measuring the block 13 and the sensor element 16. In the relative position (2), the measuring block 13 is disposed already in the sensitivity range of the sensor element 16, which corresponds to a subsequently rapidly increasing measurement signal that reaches a relative flat-running maximum in the area of full overlapping of the measuring element 13 and the sensor element 16 (position (3)). Accurate measuring or monitoring of the relative distance between the measuring block 13 and the sensor element 16 can thus be achieved corresponding to the measurement signals—at further convergence of the measuring block 13 and the sensor element 16 (as shown in FIG. 3), the maximum value of the measurement signal increases easily noticeable, which allows monitoring of the position of the path of motion of the piston with great accuracy.

One can also see from the measurement diagram that the upper dead center of the piston movement can be very easily detected as the center line of each signal stroke.

Figure 4:
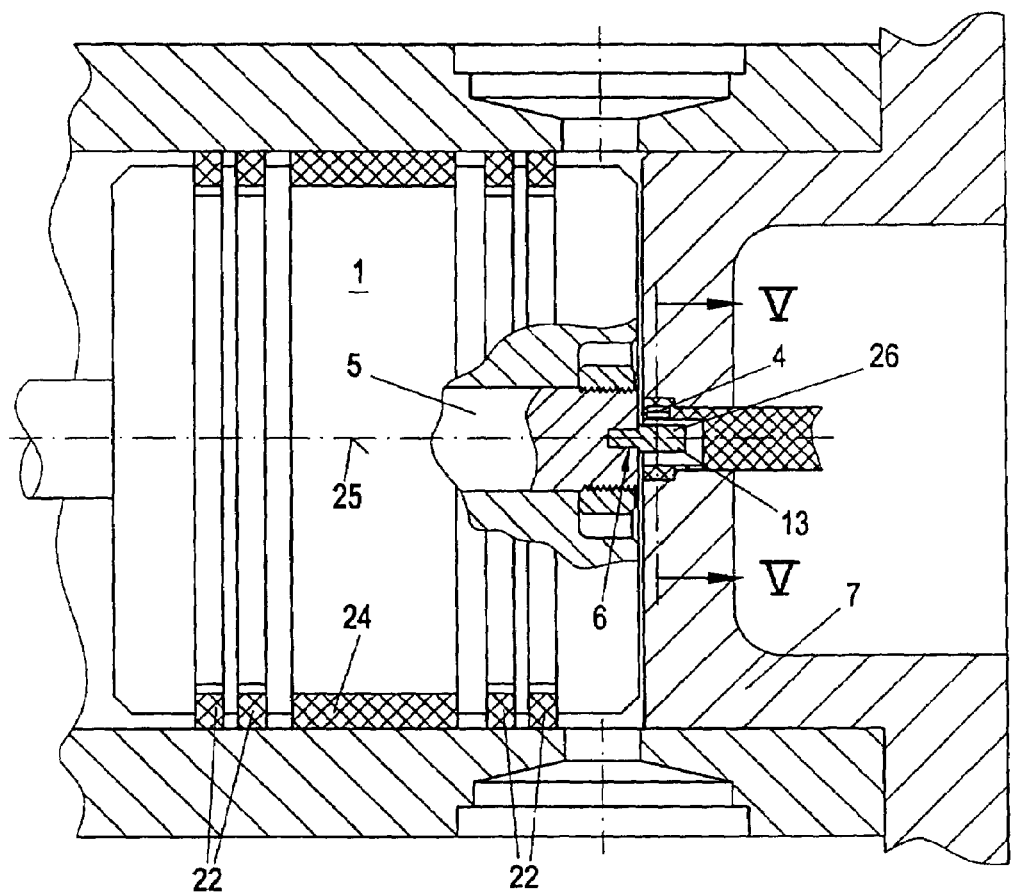
FIG. 4 shows another embodiment example of the invention in an illustration according to FIG. 1 or FIG. 3.
Figure 5:
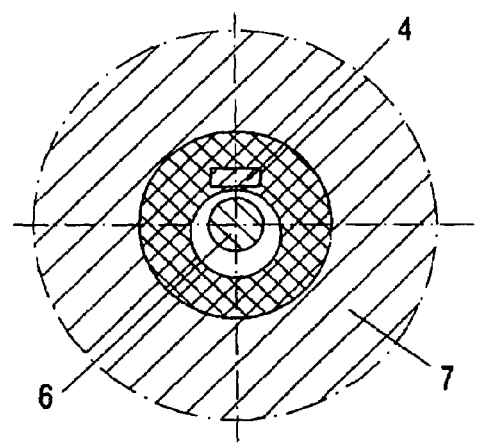
FIG. 5 shows the section V—V of FIG. 4.

In the embodiment according to FIG. 4 and FIG. 5, the measuring block 13 is designed as a cylinder 26 screwed into the front end of the piston rod 5 with a generating element lying parallel to the piston axis 25, which is the only substantial deviation to the embodiment in FIG. 1 through FIG. 3, whereby the sensor element 16 detects again the radial distance in a normal plane relative to the piston axis. Aside from the embodiments illustrated here, a plurality of sensor elements 16 could be arranged, or course, being circumferentially distributed about the cylinder 26. Just the same, there could be provided a plurality of measuring blocks 13 being spaced apart on the face of the piston 1 and cooperating with the respective sensor elements. In respect to additional characteristics and the function of the arrangement of FIG. 4 and FIG. 5, one is referred to the above embodiments of FIG. 1 through FIG. 3.

Figure 6:
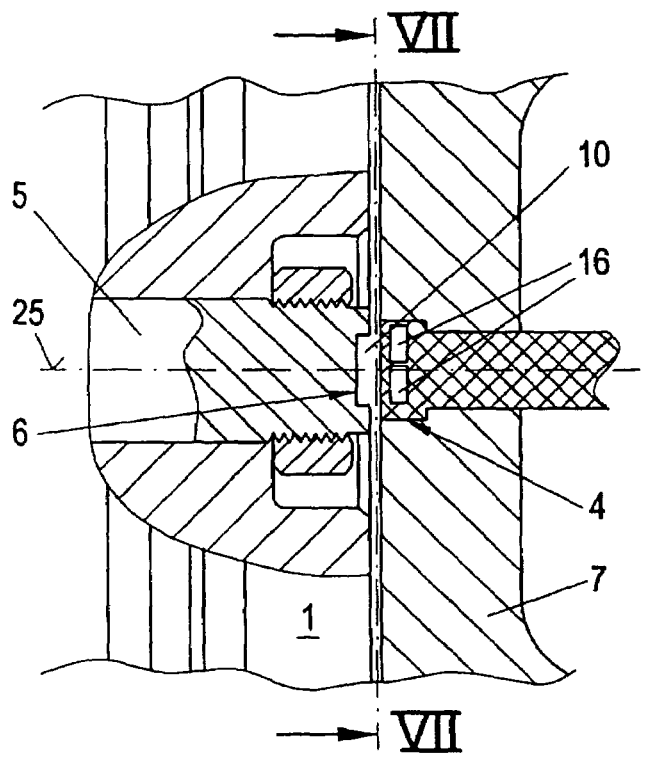
FIG. 6 shows a detail from an additional embodiment example according to the invention.
Figure 7:
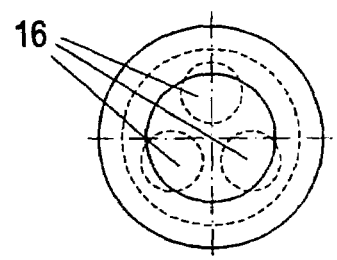
FIG. 7 shows a detailed section along the line VII—VII of FIG. 6.
Figure 8:
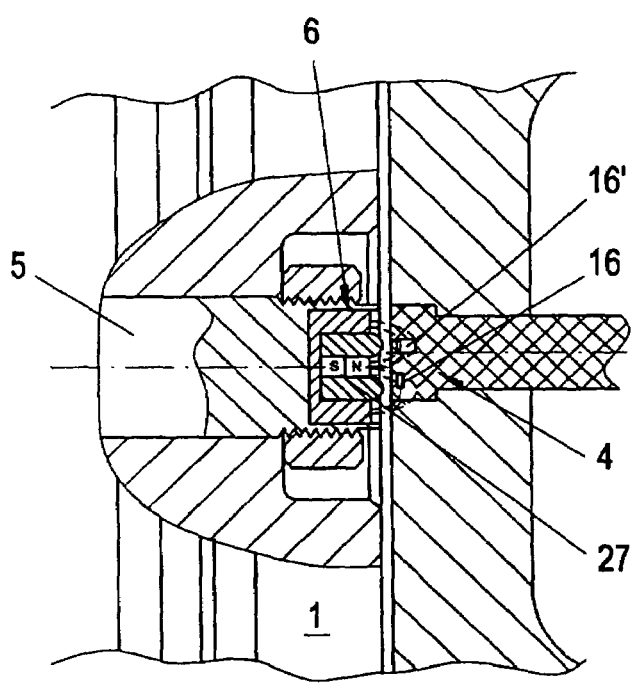
FIG. 8 shows an additional embodiment example according to the invention in an exemplary illustration of FIG. 6.

In the embodiments according to FIG. 6 through FIG. 8, there are sensor elements 16, 16' provided which can be separately interrogated by the evaluation unit (again not illustrated) and which makes possible, in a simple and meaningful manner, detection and monitoring of the position of the path of motion of the piston 1 in any direction relative to the cylinder (not illustrated here). According to FIG. 6 and FIG. 7 there are provided three identical sensor elements 16 grouped symmetrically about the piston axis 25 (e.g. eddy current sensors), which monitor the position of a spatial anomaly 10 (in form of a recess) on the front end of the piston rod 5. The signal of the sensor element 16 is thereby calibrated ahead of time in such a manner that the degree and direction of the drift of the piston axis can be determined thereby relative to the cylinder 2 or its inner wall.

The indicator unit 6 in FIG. 8 is provided with a magnetic element 27 in the formation of a smooth surface in the region of the front end of the piston rod 5 whereby said magnetic element 27 influences a sensor element 16' of the sensor 4 that is designed as a magnetic field sensor which converts the declination of the detected magnetic field lines into a measurement signal. The additional sensor element 16 can again be designed as an eddy current sensor, for example, for determination of the space at the front end of the piston rod 5 in the region of the upper dead center of the piston movement. The spatial position of the path of motion of the piston 1 can thus be determined relative to the cylinder 2.

The invention claimed is:

1. A combination of a cylinder, a piston which moves in reciprocating fashion within an interior of the cylinder along a path of motion between a lower dead end and an upper dead end, and a monitoring apparatus for detecting variations in said path of motion over time due to wear; said monitoring means comprising an indicator means at an end face of said piston, a sensor means recessed within said cylinder so as to be offset by a lateral distance "a" from said indicator means, and a cover means which seals said sensor means relative to the interior of said cylinder, said sensor means detecting wear by sensing changes in said lateral distance "a" over time.

2. A combination according to claim 1, wherein said piston includes rings which wear against an interior of said cylinder.

3. A combination according to claim 1, wherein said cylinder includes a cylinder head in which said sensor means is recessed.

4. A combination according to claim 3, including a measuring cartridge mounted in said cylinder head, said sensor means being positioned within said measuring cartridge, and wherein said indicator means comprises a measuring block connected to said piston and an indicator unit extending away from said measuring block, said indicator unit extending into said measuring cartridge adjacent said sensor when said piston is at said upper dead end.

5. A combination according to claim 4, including a piston rod which is connected to said piston and extends therethrough to an end facing said sensor means, said measuring block being connected to said end of said piston rod.

6. A combination according to claim 4, wherein said measuring cartridge includes a tubular pickup element which sealingly contacts said cylinder head, and wherein said cover means comprises a diaphragm which covers said sensor means and seals against an inside of said tubular pickup element, said diaphragm providing a channel in which said indicator unit can extend.

7. A combination according to claim 6, wherein said measuring block has a flat top surface which faces said sensor means and is perpendicular to an imaginary line which extends from said top surface to said sensor means.

8. A combination according to claim 7, wherein said diaphragm is made of a fiber-reinforced synthetic material.

9. A combination according to claim 3, including a sensor mount sealingly positioned in said cylinder head, said sensor mount defining a blind bore facing said interior of said cylinder, wherein said sensor means comprises a sensor element in said sensor mount laterally of said blind bore, and wherein said indicator means comprises a cylindrical indicator unit attached to said piston so as to extend into said blind bore when said piston is at said upper dead end.

10. A combination according to claim 9, including a piston rod which is connected to said piston and extends therethrough to an end that faces said sensor elements, and wherein said cylindrical indicator unit is attached to said end of said piston rod.

11. A combination according to claim 3, including a sensor mount sealingly positioned in said cylinder head, wherein said sensor means comprises a plurality of circumferentially-positioned sensor elements in the sensor mount, and wherein said indicator means comprises a blind bore in said end face of said piston.

12. A combination according to claim 11, including a piston rod which is connected to said piston and extends therethrough to an end that faces said sensor elements, and wherein said blind bore is formed in said end of said piston rod.

13. A combination according to claim 3, including a sensor mount sealingly positioned in said cylinder head, wherein said sensor means comprise a plurality of sensor elements in said sensor mount, and wherein said indicator means comprises a magnetic element mounted in said end face of said piston.

14. A combination according to claim 13, including a piston rod which is connected to said piston and extends therethrough to and end which faces said sensor elements, said magnetic element being mounted in said end of said piston rod.

15. A combination according to claim 14, wherein a first of said sensor elements is a magnetic field sensor for detecting magnetic field lines from said magnetic element and a second of said sensor elements is an eddy current sensor for detecting a distance to said end face of said piston.

16. A combination according to claim 1, wherein said cylinder is horizontally mounted and said sensor means comprises a plurality of vertically-spaced sensor elements.

17. A combination according to claim 1, including an evaluation unit connected to said sensor means.

18. A combination according to claim 1, including a piston rod which extends through and is connected to said piston.

* * * * *